(12) United States Patent
Goto

(10) Patent No.: US 6,297,912 B1
(45) Date of Patent: Oct. 2, 2001

(54) ZOOM LENS HAVING LOW-PASS PHASE FILTER, LENS SYSTEM HAVING LOW-PASS PHASE FILTER, AND CAMERA HAVING THE SAME ZOOM LENS OR LENS SYSTEM

(75) Inventor: Hisashi Goto, Tokyo (JP)

(73) Assignee: Olympus Optical Co. Ltd., Tokyo (JP)

( * ) Notice: Subject to any disclaimer, the term of this patent is extended or adjusted under 35 U.S.C. 154(b) by 0 days.

(21) Appl. No.: 09/391,415

(22) Filed: Sep. 8, 1999

(30) Foreign Application Priority Data

Sep. 8, 1998 (JP) .................................................. 10-253651

(51) Int. Cl.⁷ .............................. G02B 15/14; G02B 5/20
(52) U.S. Cl. .......................... 359/676; 359/683; 359/686; 359/889
(58) Field of Search .................................... 359/687, 676, 359/683, 686, 889

(56) References Cited

U.S. PATENT DOCUMENTS

| | | | |
|---|---|---|---|
| 4,989,959 | * | 2/1991 | Plummer . |
| 5,029,010 | | 7/1991 | Shiraishi .............................. 350/225 |
| 6,104,547 | * | 8/2000 | Nanba .................................. 359/687 |

FOREIGN PATENT DOCUMENTS

| | | |
|---|---|---|
| 44-1155 | 1/1969 | (JP) . |
| 63-287922 | 11/1988 | (JP) . |
| 6-94997 | 4/1994 | (JP) . |
| 10-73758 | 3/1998 | (JP) . |
| 10-82974 | 3/1998 | (JP) . |
| 10-104552 | 4/1998 | (JP) . |

\* cited by examiner

Primary Examiner—Scott J. Sugarman
(74) Attorney, Agent, or Firm—Pillsbury Winthrop LLP

(57) ABSTRACT

A lens system having a magnification changing function comprises a plurality of lens units, an aperture diaphragm, and a low-pass phase filter. At least one lens unit contributing to the magnification changing function is disposed on the image side of the aperture diaphragm. The low-pass phase filter is disposed appropriately away from the image plane. In one aspect, most of the magnification changing function is executed by the lens units disposed on the object side of the low-pass phase filter. In another aspect, the low-pass filter is constructed to be movable along the optical axis or inside or outside the optical path. In still another aspect, the low-pass filter has a variable characteristic. In further different aspect, the characteristic of the low-pass filter is determined so as to optimize the low-pass effect. Accordingly, a small-sized and inexpensive zoom lens or lens system that is capable of obtaining a substantially necessary low-pass effect regardless of the magnification condition, and a camera comprising the same zoom lens or lens system, can be provided.

69 Claims, 10 Drawing Sheets

ZOOM LENS HAVING LOW-PASS PHASE FILTER, LENS SYSTEM HAVING LOW-PASS PHASE FILTER, AND CAMERA HAVING THE SAME ZOOM LENS OR LENS SYSTEM

BACKGROUND OF THE INVENTION a) Field of the Invention

The present invention relates to a lens system with a magnification changing function, having a low-pass filter. More specifically, it relates to a small size and inexpensive zoom lens or lens system for cameras using electronic image pickup means such as a camcorder or a digital camera, and a camera using such a zoom lens or lens system.

b) Description of Related Art

Recently, a small-sized and inexpensive zoom lens for cameras using an electronic image pickup means, such as a camcorder and a digital camera, is required particularly for civilian use.

An approach for coping with the matter is to review the powers of movable units in a zoom lens system or the moving mode of moving units at the time of zooming. Solutions accordingly obtained include reduction of the number of lens elements.

For example, as a conventional zoom lens system, that comprising, in order from an object side, a first lens unit with a positive power, a second lens unit with a negative power, an aperture diaphragm, a third lens unit with a positive power, and a fourth lens unit with a positive power, wherein the second lens unit is moved for changing magnification and the fourth unit is slightly moved for image plane compensation and focusing, is known. In this type of system, since the image pickup surface side of the aperture diaphragm is not provided with a magnification changing function, the position and the size of the exit pupil do not change, the F-number or the incident angle on the image pickup surface is not subject to a change during magnification change, and thus the configuration can be provided comparatively easily with a small number of moving units. However, in terms of downsizing, since the second lens unit is burdened with substantially most of the magnification changing function, a problem arises in a large moving amount of the lens unit, and a large total length.

On the other hand, Japanese Patent Application Preliminary Publication Nos. Hei 6-94997 and Hei 6-19457 propose a method for downsizing by giving a magnification changing function to the third lens unit in addition to the second lens unit so that the third lens unit is moved at the time of magnification change. According to this type of proposal, since a lens unit having a magnification changing function is disposed on the image pickup side of the aperture diaphragm, the exit pupil changes accordingly. Therefore, the F-number changes according to magnification change. However, it would not give rise to an essential problem in terms of the photographic function.

Owing to the review of the power and the moving mode of the lens units, design of a new configuration of lens elements and proposal of a smaller optical system can be made.

Another approach is to review the optical low-pass filter used for a camcorder, a digital camera or the like. In photographing using an image pickup device such as a CCD, if frequency components higher than the picture element frequency of the image pickup device are included in the image of the object, the image pickup device generates a false signal or a false color signal so that moire fringes or the like appear in the image. As a countermeasure therefor, it is known that frequency components higher than a predetermined value can be excluded from the image of the object by disposing in the optical system an optical element having the function of an optical low-pass filter. Conventionally, quartz plates have been used as low-pass filters. That is, an object image is separated into two or more in the polarization directions of the light due to the birefringence of the quartz plate so that high frequency components of an object image can be cut off. It is also known that at least two quartz plates are required for obtaining a sufficient low-pass effect.

The quartz plates are advantageous in that a predetermined low-pass effect can be provided regardless of the diaphragm stop, and the deterioration amount of low frequency components, which determines the image quality, is small. However, since they need to be disposed between the lens system and the image pickup device and to have considerable thickness, they are an obstacle to a small-sized apparatus. Moreover, they are disadvantageous for their high cost.

As a low-pass filter other than a quartz plate, a filter that differently acts on light wavefront depending on the portion of the filter through which light is transmitted (hereinafter referred to as a low-pass phase filter) is known. For example, a phase filter proposed by Japanese Patent No. Sho 44-1155 is advantageous for having a thinner thickness compared with a quartz plate. However, there have been pointed out problems such that an image of an object not particularly focused on is formed too sharp because the filter merely divides the wavefront. A proposal to solve these problems is made in Japanese Patent Application Preliminary Publication Nos. Hei 10-82974 and Hei 10-104552.

According to the proposal, a) with the phase of the wavefront at the center of an incident beam of light being given as a reference, a step-like region having a phase advancing function to advance the phase of the wavefront of the incident beam of light and a step-like region having a phase delaying function to delay the phase of the wavefront of the incident beam of light are alternately formed in the filter; b) the filter is disposed in the vicinity of the diaphragm; so that low-pass effect is effectively obtained. According to the proposal, advantages of the low-pass filter include unchangeable low-pass effect even in the stopped-down condition, a lower cost than that of quartz plates, and capability of providing the low-pass effect to a polarizing substance, which can hardly be handled with a low-pass filter comprising a quartz plate. In addition to that, a large number of other low-pass phase filters using the diffraction phenomenon, such as a diffraction grating have been proposed.

How to arrange a low-pass phase filter in a zoom lens system is discussed in Japanese Patent Application Preliminary Publication No. Sho 63-287922, for example. Specifically, it discusses, with respect to a two-unit zoom lens system having a first lens unit with a negative power, a second lens unit with a positive power, and an aperture diaphragm disposed between the first lens unit and the second lens unit, the position of a low-pass phase filter, and concludes that disposing the low-pass filter before the second lens unit and moving it integrally with the second lens unit is advantageous. A configuration where a low-pass filter is disposed between a lens system and an image pickup device does not cause change of low-pass effect in accordance with change of magnification, but requires such a low-pass phase filter as is difficult to design and manufacture. Therefore, the low-pass phase filter is disposed between the first lens unit and the second lens unit similar to the aperture diaphragm, and is moved integrally with the second lens unit so as to make the change of the low-pass effect by change of magnification relatively small. However, the proposal is directed to an optical system with a low magnification ratio of 1.68. The problem of change of the low-pass effect still remains, and thus the proposal is not a comprehensive solution. (It is anticipated that the change of the low-pass effect will be larger with a larger magnification ratio).

Moreover, although it is not used as a low-pass filter, a liquid crystal lens, which has a uniform lens effect regardless of the polarization direction and a refracting power that is changeable by application of voltage, is disclosed by Japanese Patent Application Preliminary Publication No. Hei 10-73758.

If a low-pass phase filter is adopted in a zoom optical system with a changing exit pupil for the purpose of downsizing the optical system, since the space for a conventional quartz low-pass filter is not required, further downsizing or a higher magnification ratio can be attained. However, if it is disposed in the vicinity of the diaphragm of the optical system with the changing exit pupil, the low-pass effect is changed in accordance with magnification change and thus an optimum low-pass effect cannot be obtained from the wide angle end to the telephotographic end.

SUMMARY OF THE INVENTION

In order to solve the above-mentioned problems, an object of the present invention is to provide a small-sized and inexpensive zoom lens or lens system which uses a low-pass phase filter, is capable of providing a substantially necessary low-pass effect, has a sufficient magnification ratio and is compatible with an electronic image pickup device, and a camera using the same zoom lens or lens system.

In order to achieve the above-mentioned object, according to the present invention, (A) a zoom optical system to be used in a photographing optical system using an electronic image pickup means comprises a plurality of lens units, an aperture diaphragm, and a low-pass phase filter, wherein intervals among the plurality of the lens units change during magnification change, at least one lens unit having a magnification changing function is disposed on the image pickup device side of the aperture diaphragm, and most of the magnification changing function is executed by lens units disposed on the object side of the low-pass phase filter.

Moreover, in the optical system with the configuration (A), it is preferable that (A-1) at least one lens unit having a magnification changing function is disposed on the object side of the aperture diaphragm.

The feature (A-1) can be incorporated into the following configurations (B), (C), (D) and (E) also.

Furthermore, in the optical system with the configuration (A), it is preferable that (A-2) at least one lens unit (final lens unit) is disposed between the low-pass phase filter and the image pickup device surface.

Moreover, according to the present invention, (B) a zoom optical system to be used in a photographing optical system using an electronic image pickup means comprises a plurality of lens units, an aperture diaphragm, and a low-pass phase filter, wherein intervals among the plurality of the lens units change during magnification change, at least one lens unit having a magnification changing function is disposed on the image pickup device side of the aperture diaphragm, at least one lens unit having a magnification changing function is disposed on the image pickup device side of the low-pass phase filter, and the interval between the low-pass filter and the image pickup surface is changed so as not to substantially change the low-pass effect at the image pickup surface.

Furthermore, according to the present invention, (C) a zoom optical system to be used in a photographing optical system using an electronic image pickup means comprises a plurality of lens units, an aperture diaphragm, and a low-pass phase filter, wherein intervals among the plurality of the lens units change during magnification change, at least one lens unit having a magnification changing function is disposed on the image pickup device side of the aperture diaphragm, at least one lens unit having a magnification changing function is disposed on the image pickup device side of the low-pass phase filter, and the function of the low-pass phase filter changes so as not to substantially change the low-pass effect at the image pickup surface.

Moreover, in the optical system with the configuration (C), it is preferable that (C-1) the low-pass filter comprises a liquid crystal lens wherein the function of the low-pass filter is changed by changing the voltage supplied to the liquid crystal.

Furthermore, in the optical system with the configuration (C), it is preferable that (C-2) the low-pass filter comprises a plurality of low-pass filter elements wherein the function of the low-pass filter is changed by changing the positional relationship between the filter elements.

Moreover, in the configuration (C-2), it is preferable that (C-3) the change of the positional relationship between the low-pass filter elements is carried out by their relative movement in a plane perpendicular to the optical axis.

Furthermore, in the configuration (C-2), it is preferable that (C-4) the change of the positional relationship between the low-pass filter elements is carried out by their relative rotational movement in a plane perpendicular to the optical axis.

Moreover, according to the present invention, (D) a zoom optical system to be used in a photographing optical system using an electronic image pickup means comprises a plurality of lens units, an aperture diaphragm, and a low-pass phase filter, wherein intervals among the plurality of the lens units change during magnification change, at least one lens unit having a magnification changing function is disposed on the image pickup device side of the aperture diaphragm, the low-pass phase filter includes a plurality of low-pass phase filter elements, with at least one of the low-pass filter elements being insertable and removable in and out of the optical path.

Furthermore, according to the present invention, (E) a zoom optical system to be used in a photographing optical system using an electronic image pickup means comprises a plurality of lens units, an aperture diaphragm, and a low-pass phase filter, wherein intervals among the plurality of the lens units change during magnification change, at least one lens unit having a magnification changing function is disposed on the image pickup device side of the aperture diaphragm, at least one lens unit having a magnification changing function is disposed on the image pickup device side of the low-pass phase filter, and the low-pass phase filter is constructed to have a low-pass function such that the image pickup device can exhibit its best performance when the low-pass effect at the image pickup surface is weakest in the variable magnification range.

This and other objects as well as features and advantages of the present invention will become apparent from the following detailed description of the preferred embodiments when taken in conjunction with the accompanying drawings.

DETAILED DESCRIPTION OF THE PREFERRED EMBODIMENTS

Figure 1A:
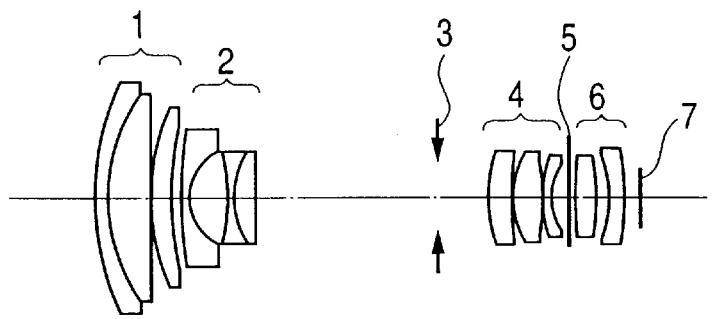
FIGS. 1A, 1B and 1C are diagrams showing the arrangement of a zoom optical system according to a first embodiment of the present invention at the wide angle end, the intermediate focal length, and the telephotographic end, respectively.

Prior to description of each embodiment, the basic configurations of the present invention generally mentioned above will be explained.

The aperture diaphragm needs to be set in consideration of supply of peripheral light amount even at the stopped-down position, and the incident angle of peripheral rays on the image pickup device. Since at least one lens unit having a magnification changing function is disposed on the image pickup device side of the aperture diaphragm in the present invention, the moving space can be efficiently allotted to the lenses for magnification change as well as the optical system can be made small in size.

In order to secure a constant low-pass effect at the image pickup surface during magnification change, in the above-mentioned configuration (A), most of the magnification changing function is executed by lens units that are disposed on the object side of the low-pass phase filter. That is, since the magnification changing function is not executed on the image pickup device side of the low-pass filter, the low-pass effect at the image pickup surface is not changed even during the magnification change, and thus the the image pickup device can exhibit its best performance from the wide angle end to the telephotographic end.

A low-pass phase filter functions by differently acting on the wavefront depending on portion thereof through which light is transmitted. Therefore, if it is disposed at a position at which a bundle of rays entering into one of picture elements of the image pickup device is narrow, that is, at a position close to the image pickup device, the low-pass phase filter is required to have a fine structure. This would limit the low-pass filter in terms of design and production. On the other hand, if a low-pass phase filter is disposed at a position where the bundle of rays is wide, that is, at a position appropriately away from the image pickup device, the structure of the filter surface can be designed easily. Accordingly, in order to dispose lenses efficiently for downsizing the optical system and to simplify design and production of the phase filter, it is preferable that at least one lens unit (final lens unit) is disposed between the low-pass phase filter and the image pickup device surface in the configuration (A).

In this case, in consideration of the above-mentioned condition that "most of the magnification changing function is executed by the lens units on the object side of the low-pass phase filter", it is preferable that the final lens unit is fixed during magnification change. However, the final lens unit can move within a range where the low-pass effect by the low-pass phase filter is not substantially bothered.

In the configuration (B) also, in order to dispose the low-pass phase filter appropriately away from the image pickup device and to dispose the lenses efficiently, at least one lens unit is disposed on the image pickup device side of the low-pass phase filter. However, unlike the case of the configuration (A), this lens unit has a magnification changing function. Therefore, the low-pass phase filter is moved in the direction of the optical axis during the magnification change in such a manner that the influence on the low-pass effect at the image pickup surface caused by the magnification change on the image pickup device side of the filter can be offset, that is, that the low-pass effect at the image pickup surface is not substantially changed.

Even if no lens unit with a considerable magnification changing function is disposed on the image pickup device side of the low-pass phase filter, this conception can be adopted also to the case where the low-pass effect at the image pickup surface is changed by movement of the lens units, by change of shape of refracting or reflecting surfaces, by change of the refractive index of the medium, or by the like. That is, the low-pass effect at the image pickup surface is corrected by movement of the low-pass phase filter in the direction of the optical axis.

In the configuration (C) also, at least one lens unit having a magnification changing function is disposed on the image pickup device side of the low-pass phase filter. However, in order to maintain a substantially constant low-pass effect at the image pickup surface, the function of the low-pass phase filter itself is changed. Accordingly, the low-pass phase filter can be disposed at a necessary position without limitation of the space around it. For example, it can be disposed in the vicinity of the aperture diaphragm, which is said to be most effective. The above-mentioned features (C-1) to (C-4) relate to the measures for changing the function of the low-pass phase filter.

According to the feature (C-1) that the low-pass filter comprises a liquid crystal lens so that the refractive index is changeable by application of a voltage, a low-pass effect necessary for photographing at the image pickup surface can be obtained.

The voltage to be applied to the liquid crystal can be determined according to the focal length of the zoom lens system or focusing condition, or further, in consideration of the temperature, which influences the refractive index of the liquid crystal. Moreover, a means for monitoring the low-pass effect itself may be provided so that the voltage is determined using an output from the monitor.

It is preferable that the low-pass effect of the liquid crystal lens does not differ depending on the polarization direction.

A low-pass phase filter made of a liquid crystal lens comprises a first main body made of a substantially transparent birefringent liquid crystal material, a second main body made of a substantially transparent birefringent liquid crystal material, and a member having at least one pair of electrodes for applying an electric field or magnetic field to the entirety of the first main body and the second main body, wherein liquid crystal molecules at the rear surface of the first main body and liquid crystal molecules at the front surface of the second main body are oriented orthogonal to each other, and the first main body and the second main body are shaped to be symmetrical about a plane perpendicular to the optical axis so that the first main body and the second main body have the same low-pass effect. Therefore, the same low-pass effect can be obtained regardless of the polarization direction, and the low-pass effect can be changed by the voltage applied to the liquid crystals. It is also possible to use a chiral nematic liquid crystal or cholesteric liquid crystal, which has a layered structure with the longitudinal axis of molecules in each layer being twisted from that of adjacent layer when a voltage is not applied.

Alternatively, as in the feature (C-2), a necessary low-pass effect can be obtained by superimposing a plurality of low-pass filter elements on each other in the direction of the optical axis and changing their positions relative to each other so that a resultant function of the entire low-pass filter is changed. Since a single low-pass filter element is thin, even if a plurality of low-pass filter elements are superimposed on each other, it does not prevent downsizing of the zoom optical system. The direction of the positional change can be along the optical axis. It is also possible to dispose a lens element between the plurality of phase filters and to make each interval changeable.

Alternatively, as in the feature (C-3), the change of the positional relationship can be carried out by relative movement of the filters in a plane perpendicular to the optical axis. As a result, a combination of portions of the respective filters through which a bundle of rays is transmitted can be changed.

Alternatively, as in the feature (C-4), the change of the positional relationship can be carried out by rotational relative movement of the filters in a plane perpendicular to the optical axis. As a result, in addition to the effect of the feature (C-3), the size of the low-pass phase filter can be determined only by the size of the beam of light to be transmitted there. Furthermore, since a space outside the beam of light is not necessary to be reserved for the movement of the low-pass phase filter, this feature is suitable for downsizing.

According to the configuration (D), the low-pass phase filter includes a plurality of low-pass filter elements, with at least one of the low-pass filter elements being removable from the optical path. Thus, a resultant low-pass phase filter unit disposed in the zoom lens system can cause a required low-pass effect at the image pickup surface.

The insertable and removable low-pass filter does not need to be at the same position, but can be inserted at different positions in the lens system. Accordingly, without increasing the number of the phase filters, a required low-pass state at the image pickup surface can be obtained by changing the insertion position even if the magnification is changed in the zoom optical system.

The insertion or removal of the filter is not limited to the physical movement of the filter in or out of the beam of light, but it may be realized by vanishing or exhibiting the low-pass function of the filter by means of the feature (C-1), the feature (C-4) or the like with the filter remaining inserted in the optical system.

According to the configuration (E), since the low-pass phase filter can be disposed at a position where the beam of light is wide, it is advantageous for design or production of the low-pass phase filter as mentioned above. Since at least one lens unit having a magnification changing function is disposed on the image pickup device side of the low-pass phase filter, the low-pass effect at the image pickup surface is changed by a magnification change. Since the low-pass phase filter is constructed such that the image pickup device can exhibit its best performance when the low-pass effect at the image pickup surface is weakest, there would be some magnification state where the low-pass effect is so strong that the image quality is deteriorated. This configuration, however, is free from a false signal or the like and is simple in the lens system, and thus it is preferable for downsizing and cost reduction of the system as a whole.

Specifically, for example, the characteristic of the low pass filter is preferably determined such that, with respect to MTF measured at the image center, a value of the MTF is 0.3 or less at a spatial frequency higher than the Nyquist frequency in a state where the cutoff spatial frequency of the lens system is highest, as well as a value of the MTF at two third the Nyquist frequency is highest in the above-mentioned state among all possible states of the lens unit movement.

Figure 9A:
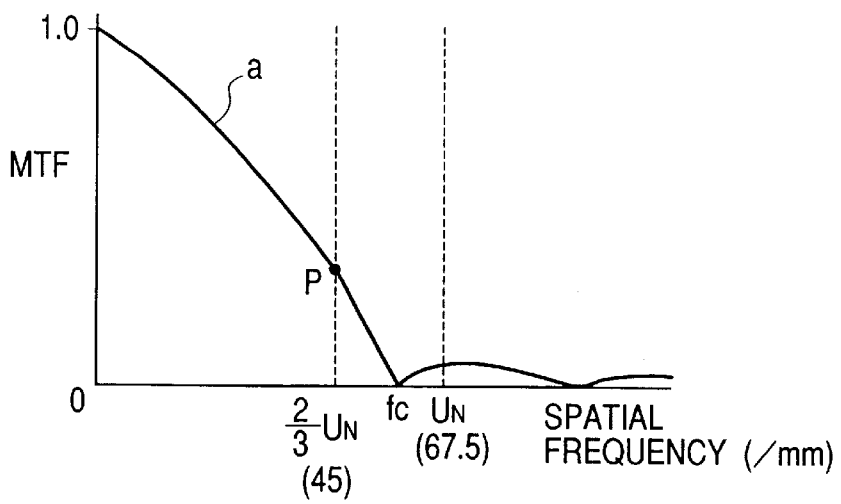
FIGS. 9A, 9B and 9C are graphs showing MTF versus spatial frequency according to the zoom optical system of the seventh embodiment at the wide angle end, the intermediate focal length, and the telephotographic end, respectively.
Figure 9B:
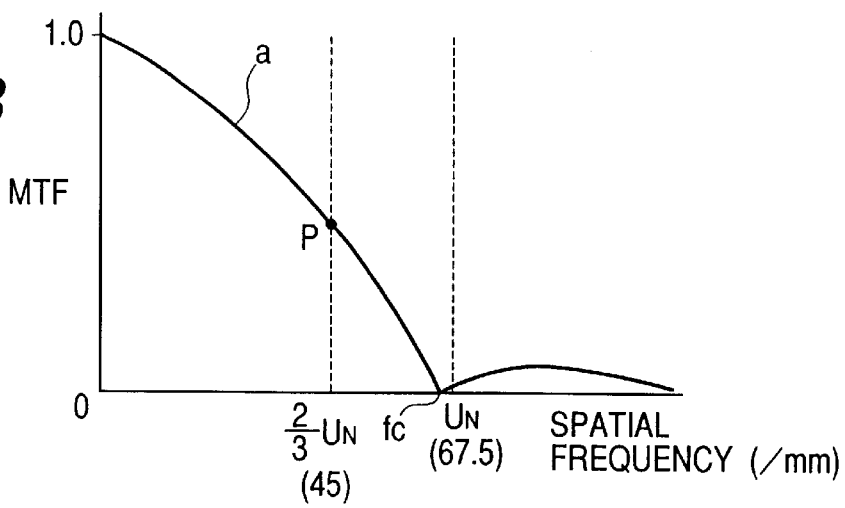
Figure 9C:
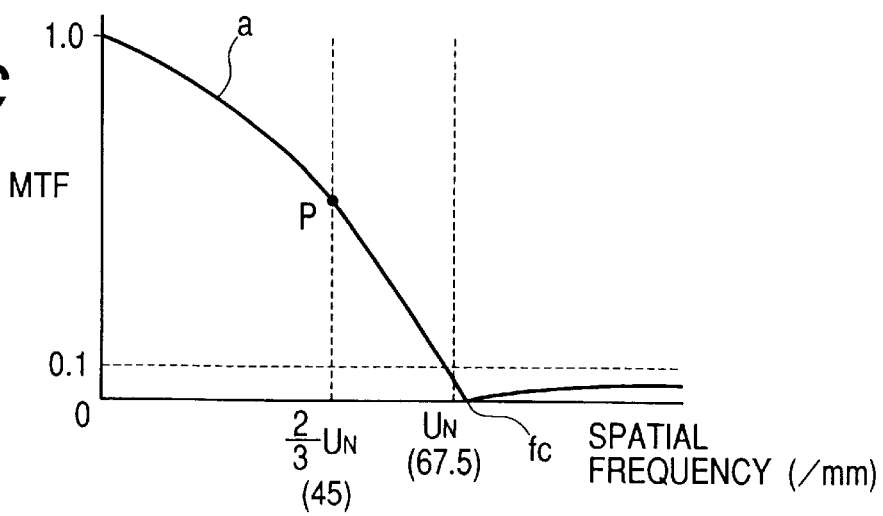

Here, the relationship between the MTF and the spatial frequency is shown in FIGS. 9A, 9B and 9C, where the MTF is plotted in the vertical axis and the spatial frequency is plotted in the horizontal axis. In the graphs, $U_N$ refers to the Nyquist frequency, which equals to ½p where p is the smallest pitch of the picture elements of the image pickup device. The solid line a shows MTF, measured at the image center, of the entire lens system including the low-pass phase filter, as a function of spatial frequency. The point P shows a value of MTF of the entire lens system at the spatial frequency of $(2/3)*U_N$.

It is well known that MTF is preferably sufficiently lowered for spatial frequencies greater than $U_N$ by a low-pass filter in order to prevent generation of moire, but is preferably large for spatial frequencies smaller than $U_N$ in order to obtain an image with a high contrast and a high definition. Therefore, according to the present invention, the MTF is lowered for spatial frequencies greater than $U_N$ by the use of the low-pass phase filter as mentioned above, as well as it is maintained high for spatial frequencies smaller than $U_N$. A spatial frequency at which the MTF becomes 0 is obtained by the low-pass effect of the low-pass filter. Here, the smallest spatial frequency at which the MTF of the entire lens system at the image center is 0 is referred to as a cutoff spatial frequency fc.

If the cutoff spatial frequency fc is close to the Nyquist frequency $U_N$, an image with a high contrast and a high definition can be obtained without conspicuous flare. However, in the present configuration, since a lens unit with a magnification changing function is disposed on the image side of the low-pass phase filter in order to achieve a small size, the value of the cutoff spatial frequency fc changes according to the lens movement.

The state where the cutoff spatial frequency of the lens system is largest with respect to the MTF at the image center can be supposed to be an example of the state where the low-pass effect at the image pickup surface is weakest. The condition where the MTF for spatial frequencies higher than the Nyquist frequency is 0.3 or less and where the MTF at the two third the Nyquist frequency (=⅔p) is highest in the above-mentioned state among possible states of the lens units movement can be supposed to be an example of the condition where the image pickup device can exhibit its best performance when the low-pass effect on the image pickup surface is weakest. A configuration of the lens system based on this consideration can repress generation of moire over the entire moving range of the lens system as well as simplify itself. Furthermore, if the MTF for spatial frequencies higher than the Nyquist frequency is 0.2 or less, or further, 0.1 or less in the above-mentioned state, it is further effective for reduction of moire. The above-mentioned condition may be satisfied for any wavelength in the visible region, but it is more preferable that it is satisfied for d-line (587.6 nm) rays.

In order to achieve further efficient arrangement of the moving space for magnification change and further downsizing of the optical system in the above-mentioned configurations (A) to (E), it is preferable that at least one lens unit having a magnification changing function is disposed on the object side of the aperture diaphragm.

Figure 6A:
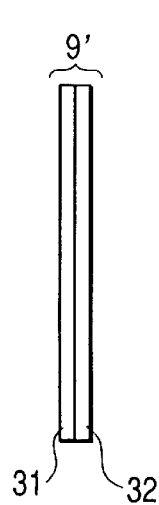
FIGS. 6A, 6B and 6C are schematic diagrams showing an example of a low-pass phase filter according to the fifth embodiment.
Figure 6B:
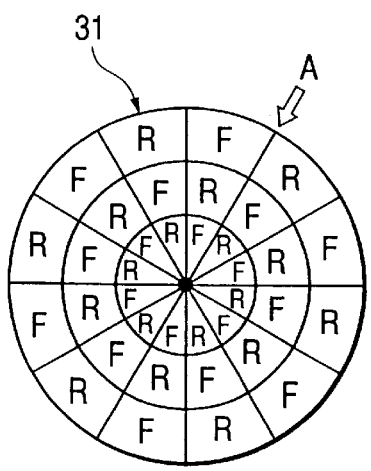

The basic configurations of the present invention have been explained so far. Although a low-pass phase filter used for the present invention is not particularly limited as long as it is a thin filter having a low-pass effect, it is preferable to have the following features:

a) with the phase of the wavefront at the center of an incident beam of light being taken as a reference, a region having a phase advancing function to advance the phase of the wavefront of a bundle of rays incident thereon and a region having a phase delaying function to delay the phase of the wavefront of a bundle of rays incident thereon are alternately formed in the filter as shown in FIG. 6B;

b) a function of dividing the wavefront of the incident beam of light into a large number is provided; and c) a diffraction grating is provided.

Figure 13:
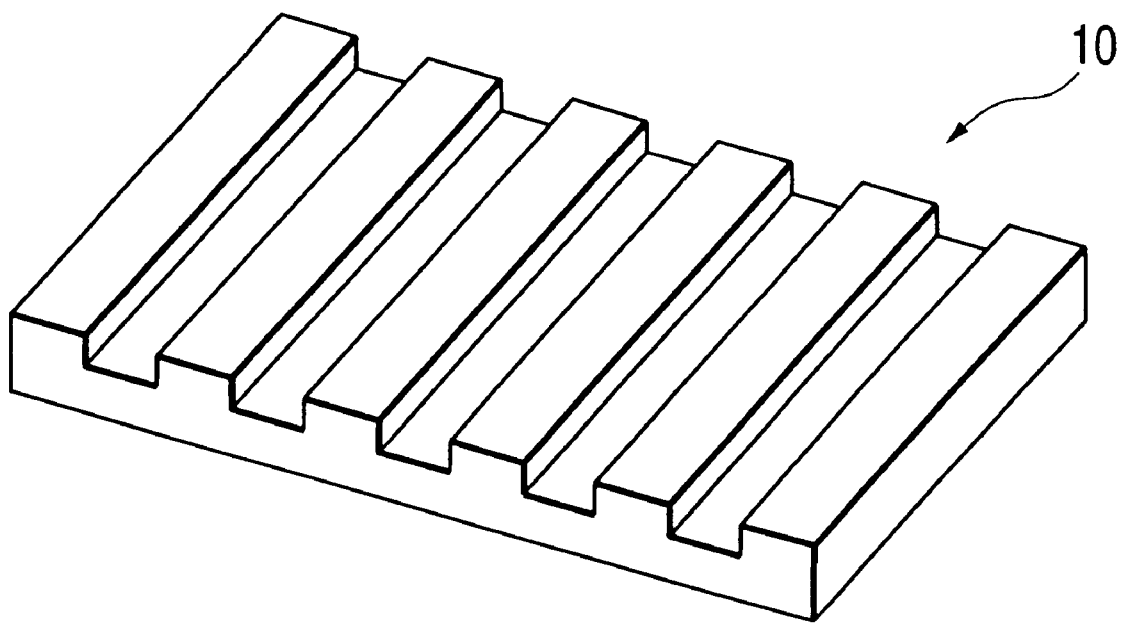
FIG. 13 shows an example of the diffraction grating used as a low-pass phase filter according to the present invention.

For example, a diffraction grating 10 of a relief type having ridges and furrows as shown in FIG. 13 is applicable. Not limited to this type, any diffraction grating having low-pass effect is applicable as a matter of course.

First Embodiment

Figure 1B:
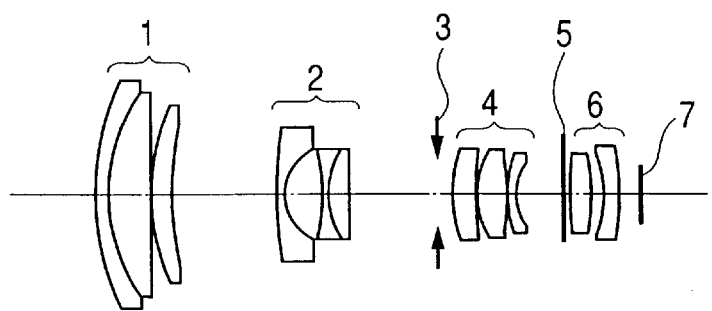
Figure 1C:
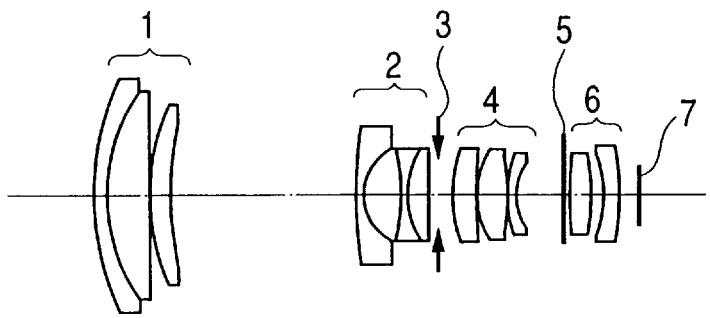

The configuration of a first embodiment is shown in FIGS. 1A to 1C. The optical system of the first embodiment comprises, in order from an object side, a first lens unit 1 which has a positive power and is fixed during a magnification change, a second lens unit 2 which has a negative power, is movable during a magnification change and has a magnification changing function, an aperture diaphragm 3 with a variable aperture diameter, a third lens unit 4 which has a positive power, is movable during a magnification change and has a magnification changing function, a low-pass phase filter 5, a fourth lens unit 6 which is fixed during a magnification change, and an image pickup device surface 7. The optical system is constructed so that the amount of movement of the second lens unit 2 is largest through the entire variable magnification range among all the lens units. The optical system is constructed so that the maximum aperture diameter of the aperture diaphragm is constant from the wide angle end to the telephotographic end and thus the open F number is changed in accordance with a magnification change. Since the optical system does not includes a quartz low-pass filter as a conventional case does, it allows the lens units to be disposed relatively close to the image pickup device on the object side thereof so as to contribute to downsizing and a high performance of a zoom optical system. Since the fourth lens unit 6, which is fixed during a magnification change, is disposed on the image pickup device side of the low-pass phase filter 5, the low-pass effect at the image pickup surface by the low-pass phase filter 5 is not changed even in the magnification change from the wide angle end to the telephotographic end.

Second Embodiment

Figure 2A:
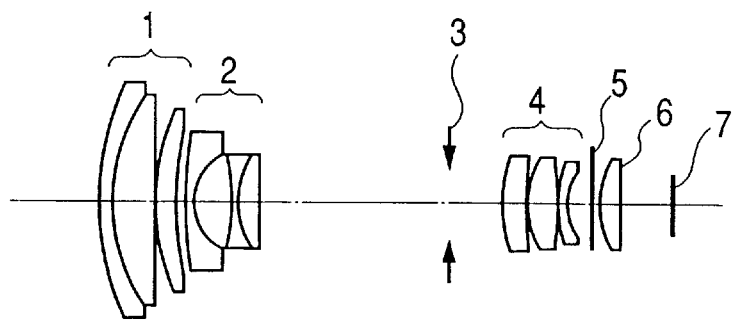
FIGS. 2A, 2B and 2C are diagrams showing the arrangement of a zoom optical system according to a second embodiment of the present invention at the wide angle end, the intermediate focal length, and the telephotographic end, respectively.
Figure 2B:
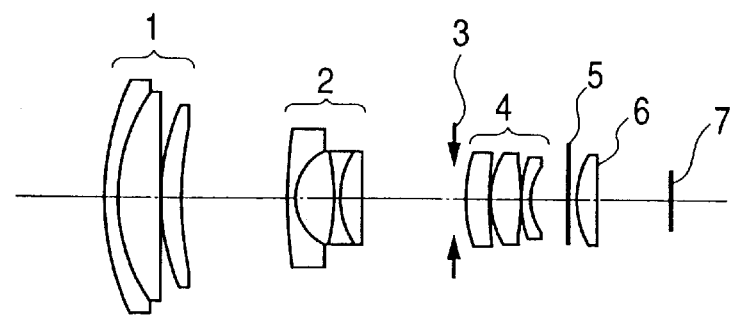
Figure 2C:
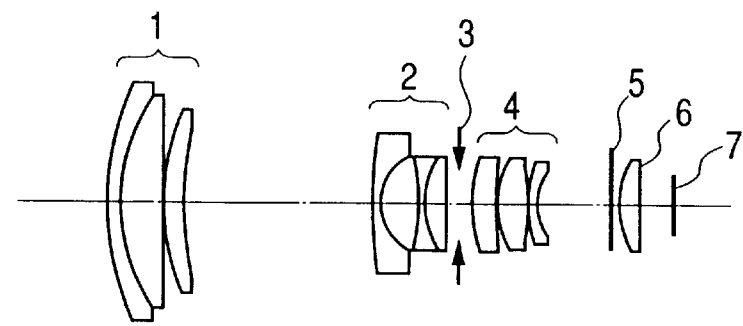

The configuration of a second embodiment is shown in FIGS. 2A to 2C. The optical system of the second embodiment comprises, in order from an object side, a first lens unit 1 which has a positive power and is fixed during a magnification change, a second lens unit 2 which has a negative power, is movable during a magnification change and has a magnification changing function, an aperture diaphragm 3 with a variable aperture diameter, a third lens unit 4 which has a positive power, is movable during a magnification change and has a magnification changing function, a low-pass phase filter 5, a fourth lens unit 6 which has a positive power and is movable during a magnification change to an extent of compensating the image plane, and an image pickup device surface 7. The optical system is constructed so that the amount of movement of the second lens unit 2 is largest through the entire variable magnification range among all the lens units. The optical system is constructed so that the maximum aperture diameter of the aperture diaphragm is constant from the wide angle end to the telephotographic end and thus the open F number is changed in accordance with a magnification change. Since the optical system does not includes a quartz low-pass filter as a conventional case does, it allows the lens units to be disposed relatively close to the image pickup device on the object side thereof so as to contribute to downsizing and a high performance of a zoom optical system. Since the fourth lens unit 6, which is slightly movable during a magnification change but does not substantially contribute to the magnification change, is disposed on the image pickup device side of the low-pass phase filter 5, the low-pass effect at the image pickup surface by the low-pass phase filter 5 is not changed to the extent of causing a substantial problem even in the magnification change from the wide angle end to the telephotographic end.

It is also possible to change the interval between the low-pass phase filter 5 and the fourth lens unit 6 during a magnification change for further reducing the change of the low-pass effect at the image pickup surface.

Third Embodiment

Figure 3A:
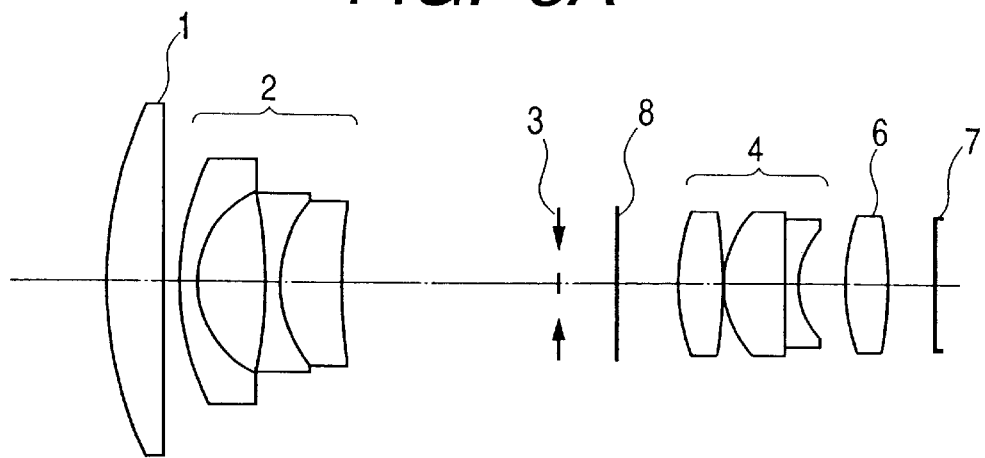
FIGS. 3A, 3B and 3C are diagrams showing the arrangement of a zoom optical system according to a third embodiment of the present invention at the wide angle end, the intermediate focal length, and the telephotographic end, respectively.
Figure 3B:
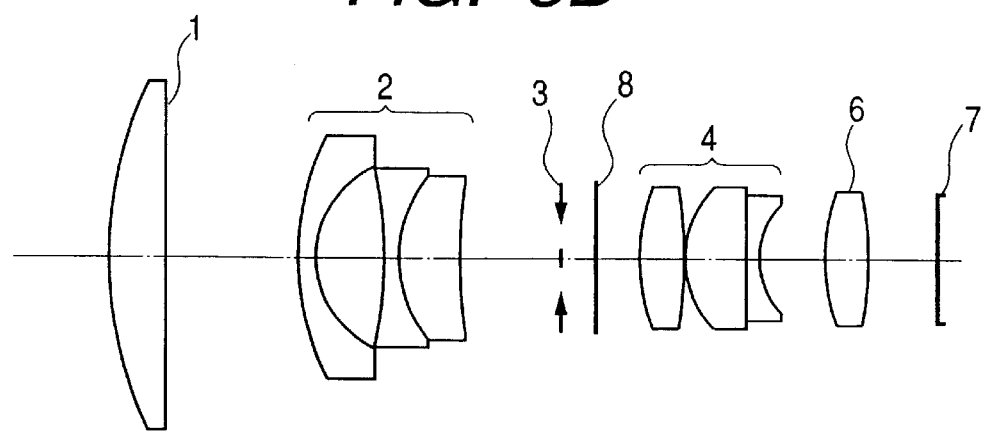
Figure 3C:
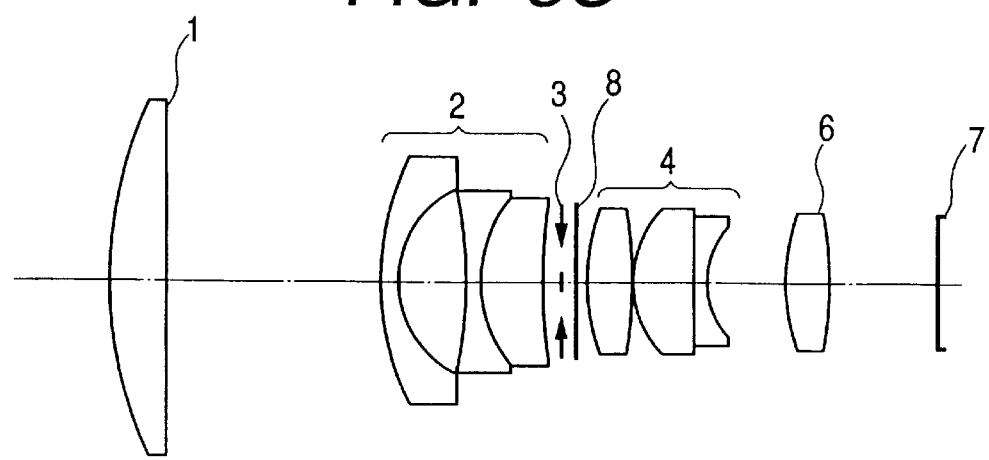

The configuration of a third embodiment is shown in FIGS. 3A to 3C. The optical system of the third embodiment comprises, in order from an object side, a first lens unit 1 which has a positive power and is fixed during a magnification change, a second lens unit 2 which has a negative power, is movable during a magnification change and has a magnification changing function, an aperture diaphragm 3 which has a variable aperture diameter and is fixedly positioned in the optical path during a magnification change, a low-pass phase filter 8 which is movable during a magnification change, a third lens unit 4 which has a positive power, is movable during a magnification change and has a magnification changing function, a fourth lens unit 6 which has a positive power and is movable during a magnification change to an extent of compensating the image plane, and an image pickup device surface 7. The optical system is constructed so that the amount of movement of the second lens unit 2 is largest through the entire variable magnification range among all the lens units. The optical system is constructed so that the maximum aperture diameter of the aperture diaphragm is constant from the wide angle end to the telephotographic end and thus the open F number is changed in accordance with a magnification change. Since the optical system does not includes a quartz low-pass filter as a conventional case does, it allows the lens units to be disposed relatively close to the image pickup device on the object side thereof so as to contribute to downsizing and a high performance of a zoom optical system. Like the aperture diaphragm 3, the low-pass phase filter 8 is disposed between the second lens unit 2 and the third lens unit 4. Since the beam of light is wide at this position, it is advantageous for design and production of a low-pass phase filter. The low-pass filter 8 is movable during a magnification change so as to reduce the change of the low-pass effect at the image pickup surface. It is further possible to construct and arrange the low-pass phase filter 8 to be movable integrally with the third lens unit 4, depending on the condition of the composite front side focal point of the third lens unit 4 and the fourth lens unit 6.

Fourth Embodiment

Figure 4A:
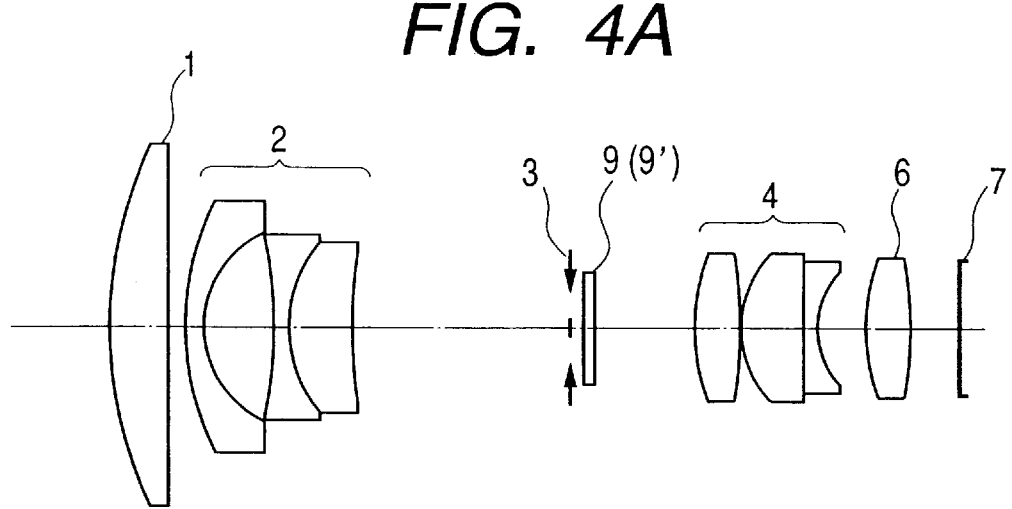
FIGS. 4A, 4B and 4C are diagrams showing the arrangement of a zoom optical system according to fourth and fifth embodiments of the present invention at the wide angle end, the intermediate focal length, and the telephotographic end, respectively.
Figure 4B:
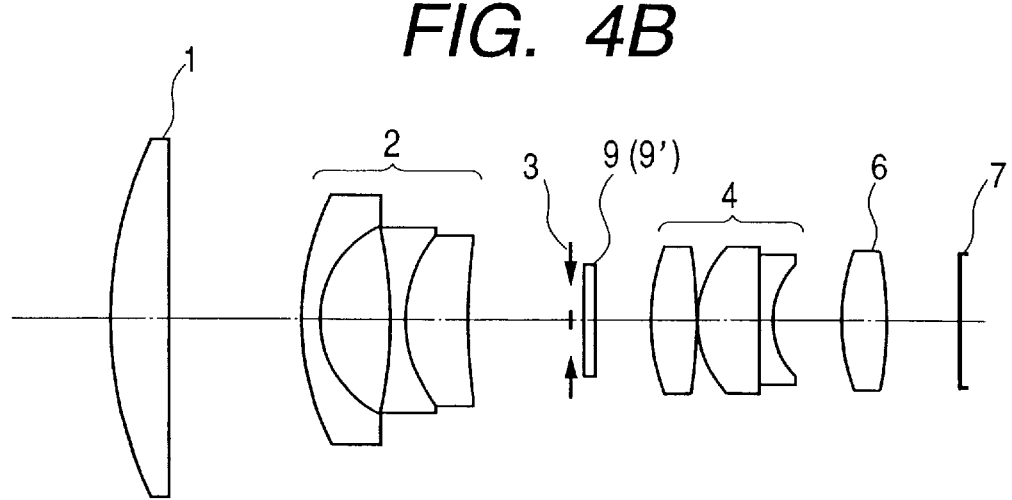
Figure 4C:
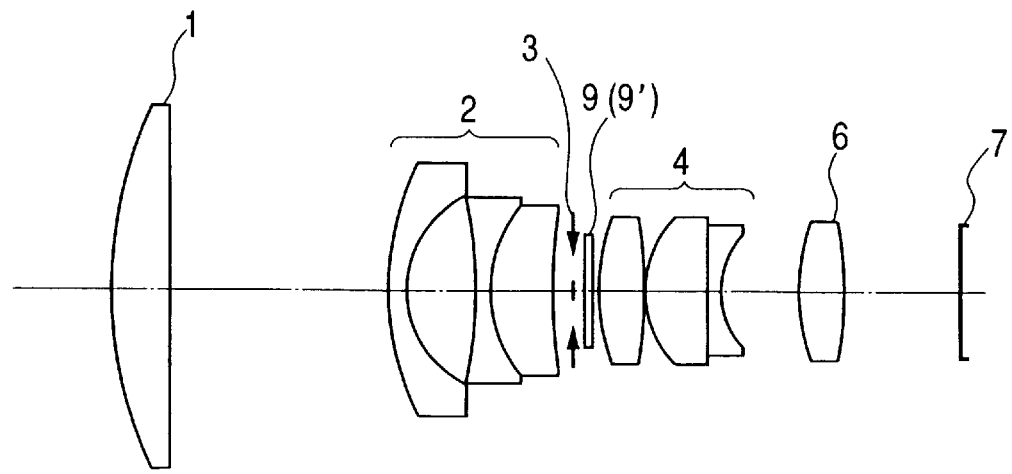

The configuration of a fourth embodiment is shown in FIGS. 4A to 4C. The optical system of the fourth embodiment comprises, in order from an object side, a first lens unit 1 which has a positive power and is fixed during a magnification change, a second lens unit 2 which has a negative power, is movable during a magnification change and has a magnification changing function, an aperture diaphragm 3 which has a variable aperture diameter and is fixedly positioned in the optical path during a magnification change, a low-pass phase filter 9 which is made of a liquid crystal material and has a changeable low-pass function, a third lens unit 4 which has a positive power, is movable during a magnification change and has a magnification changing function, a fourth lens unit 6 which has a positive power and is movable during a magnification change to an extent of compensating the image plane, and an image pickup device surface 7. The optical system is constructed so that the amount of movement of the second lens unit 2 is largest through the entire variable magnification range among all the lens units. The optical system is constructed so that the maximum aperture diameter of the aperture diaphragm is constant from the wide angle end to the telephotographic end and thus the open F number is changed in accordance with a magnification change. Since the optical system does not includes a quartz low-pass filter as a conventional case does, it allows the lens units to be disposed relatively close to the image pickup device on the object side thereof so as to contribute to downsizing and a high performance of a zoom optical system. The low-pass phase filter 9 is disposed in the vicinity of the aperture diaphragm 3. Since the beam of light is wide at this position, it is advantageous for design and production of a low-pass phase filter. The low-pass filter 9 changes its low-pass function during a magnification change so as to reduce the change of the low-pass effect at the image pickup surface.

Figure 5A:
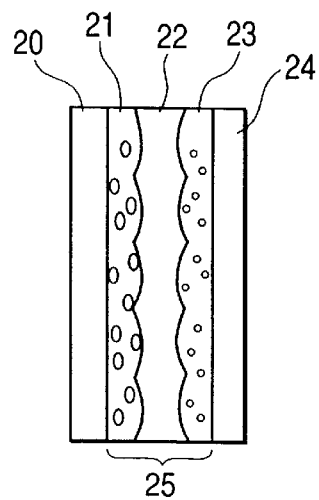
FIGS. 5A and 5B are schematic diagrams showing an example of a low-pass phase filter according to the fourth embodiment.
Figure 5B:
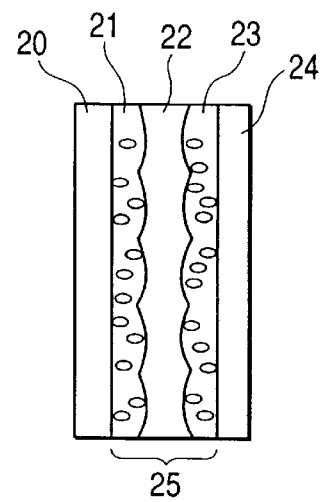

FIGS. 5A and 5B schematically show an example of a low-pass phase filter with a changeable low-pass function to be used in the fourth embodiment. A liquid crystal element 25 is interposed between plane parallel plate glasses 20, 24 and comprises birefringent liquid crystal materials 21, 23, and an intermediate lens layer 22 with a symmetrical shape toward the object side and the image pickup side. FIG. 5A shows the state where a charge is not applied to the liquid crystal. In this state, the liquid crystal is in a homogeneous alignment, with the directions of the longitudinal axes of the liquid crystal molecules being orthogonal to the optical axis. Since the orientations of the birefringent liquid crystal materials 21, 23 are orthogonal with each other, a polarized ray that is subjected to an ordinary index by the birefringent liquid crystal material 21 is subjected to an extraordinary index by the birefringent liquid crystal material 23. On the other hand, a polarized ray that is subjected to the extraordinary index by the birefringent liquid crystal material 21 is subjected to the ordinary index by the birefringent liquid crystal material 23. As a result, all the rays undergo the same function. FIG. 5B shows the state where a charge is applied to the liquid crystal. The liquid crystal is in a homeotropic alignment, with the directions of the longitudinal axes of the liquid crystal molecules being parallel with the optical axis. Therefore, all the rays are subjected to an ordinary index by the birefringent liquid crystal materials 21, 23 so as to have a low-pass function different from the case where a charge is not applied.

Fifth Embodiment

Since a fifth embodiment is the same as the fourth embodiment except the configuration of a low-pass phase filter, the arrangement, the function and the effect of the entire optical system shown in FIGS. 4A to 4C are not explained here.

A low-pass phase difference filter 9' to be used in the fifth embodiment comprises a plurality of filters superimposed on each other, with a changeable low-pass function.

Figure 6C:
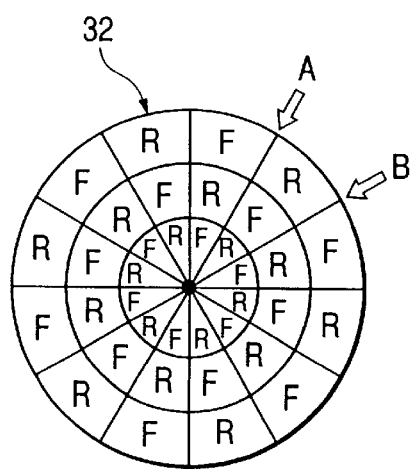

FIGS. 6A, 6B and 6C schematically show an example of a low-pass phase filter with a changeable low-pass function to be used in the fifth embodiment. The low-pass filter 9' comprises two filters 31, 32, each of which has regions F with a phase advancing function to advance the phase of the wavefront of bundles of rays incident thereon and regions R with a phase delaying function to delay the phase of the wavefront of bundles of rays incident thereon formed alternately. The filters 31, 32 have the same layout, but the filter 32 has weaker phase advancing function and weaker phase delaying function than the filter 31.

A position where the two filters are superimposed on each other such that the regions with the phase advancing function are superimposed on each other and the regions with the phase delaying functions are superimposed on each other (where the portion shown by the arrow A of the filter 31 in FIG. 6B and the portion shown by the arrow A of the filter 32 in FIG. 6C coincides with each other) and a position where the two filters are superimposed on each other such that the regions with the phase advancing function and the regions with the phase delaying function coincides with each other (where the portion shown by the arrow A of the filter 31 and the portion shown by the arrow B of the filter 32 coincide with each other) are alternated by rotating at least either one of the filters with a rotating means so as to change low-pass function to be obtained. Although a schematic example is shown here, it is also possible to continuously change the filter characteristic by appropriately setting the configuration of the two filters.

Sixth Embodiment

Figure 7A:
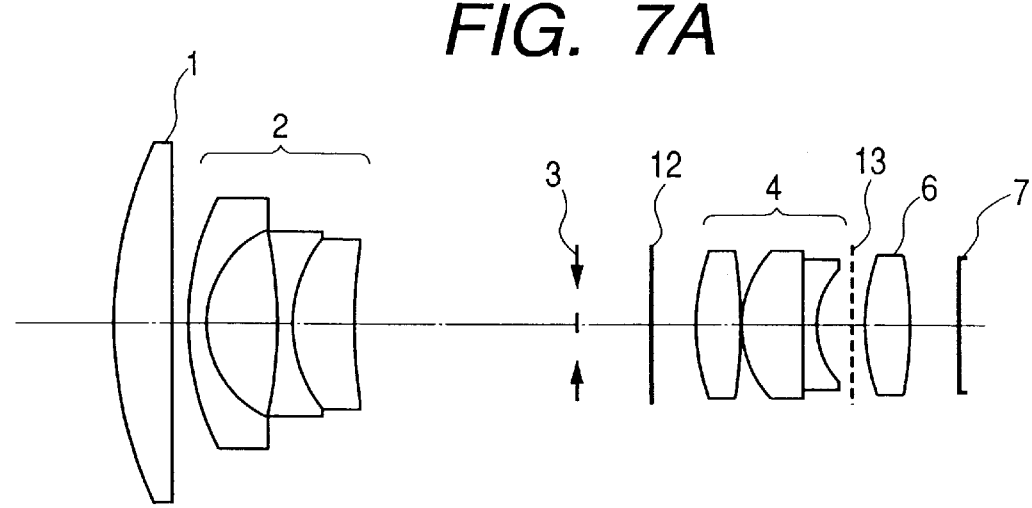
FIGS. 7A, 7B and 7C are diagrams showing the arrangement of a zoom optical system according to a sixth embodiment of the present invention at the wide angle end, the intermediate focal length, and the telephotographic end, respectively.
Figure 7B:
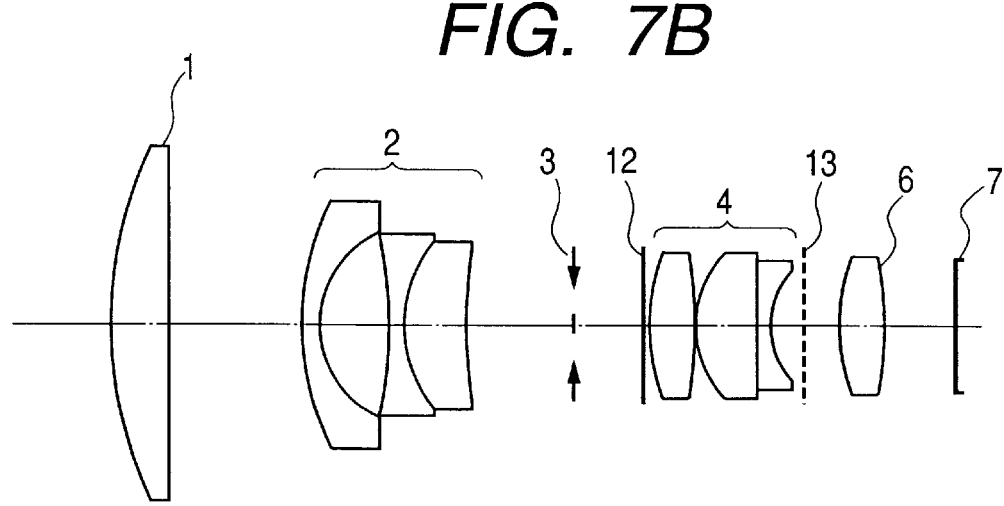
Figure 7C:
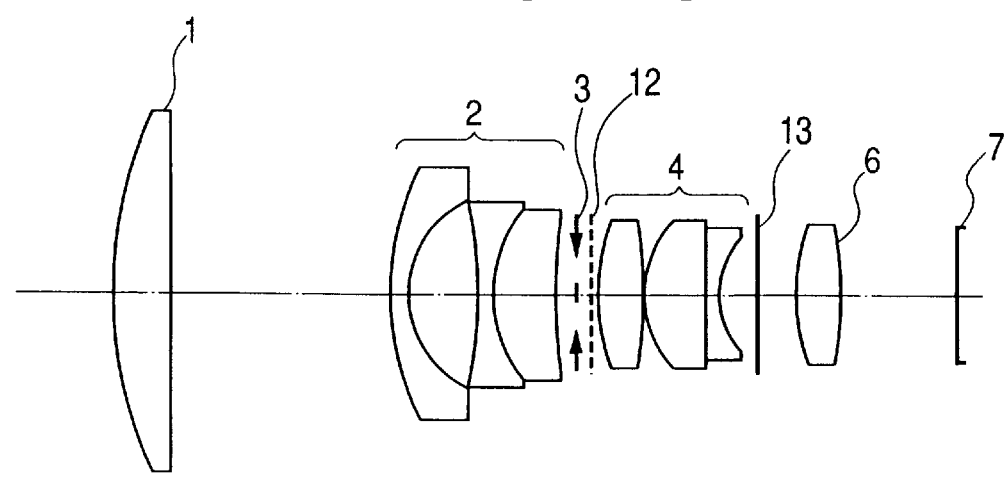

The configuration of a sixth embodiment is shown in FIGS. 7A to 7C. The optical system of the sixth embodiment comprises, in order from an object side, a first lens unit 1 which has a positive power and is fixed during a magnification change, a second lens unit 2 which has a negative power, is movable during a magnification change and has a magnification changing function, an aperture diaphragm 3 which has a variable aperture diameter and is fixedly positioned in the optical path during a magnification change, a first low-pass phase filter 12 which is insertable and removable in and out of the optical path, a third lens unit 4 which has a positive power, is movable during a magnification change and has a magnification changing function, a second low-pass phase filter 13 which is insertable and removable in and out of the optical path, a fourth lens unit 6 which has a positive power and is movable during a magnification change, and an image pickup device surface 7. The optical system is constructed so that the amount of movement of the second lens unit 2 is largest through the entire variable magnification range among all the lens units. The optical system is constructed so that the maximum aperture diameter of the aperture diaphragm is constant from the wide angle end to the telephotographic end and thus the open F number is changed in accordance with a magnification change. Since the optical system does not includes a quartz low-pass filter as a conventional case does, it allows the lens units to be disposed relatively close to the image pickup device on the object side thereof so as to contribute to downsizing and a high performance of a zoom optical system. The first low-pass phase filter 12 is disposed in the vicinity of the aperture diaphragm 3. Since the beam of light is wide at this position, it is advantageous for design and production of a low-pass phase filter. The filter 12 is in the optical path in a variable magnification range from the wide angle end to the intermediate angle, where the change of its low-pass effect at the image pickup surface is within a range as not causing a substantial problem. In a variable magnification range from the intermediate angle to the telephotographic end, the low-pass filter 12 is withdrawn from the optical path. On the other hand, the second low-pass phase filter 13 is withdrawn from the optical path in the variable magnification range from the wide angle end to the intermediate angle. Since the beam of light is sufficiently wide at a position in the optical path where the second low-pass phase filter 13 is to be inserted in the variable magnification range from the intermediate angle to the telephotographic end, it is advantageous for design and production of a low-pass phase filter. The filter 13 is in the optical path in the variable magnification range from the intermediate angle to the telephotographic end where the change of its low-pass effect at the image pickup surface is within a range as not causing a substantial problem.

Change of the low-pass effect at the image pickup surface can be further reduced by constructing and arranging the first and second low-pass filters 12, 13 to be movable along the optical axis or to be changeable in low-pass function during a magnification change.

The first and second low-pass filters 12, 13 need not be physically removed from or inserted in the optical path, but they can be removed from or inserted in the optical path by vanishing or exhibiting their function. In a case where the low-pass filter made of a liquid crystal as shown in FIGS. 5A and 5B is used, if the refractive index of the intermediate lens 22 is arranged to be the same as the ordinary index of the liquid crystal, the filter loses its low-pass function in the state where a voltage is applied so that it acts equivalent to a plane parallel plate. Moreover, for example, if the two filters shown in FIGS. 6A to 6C are constructed to have an equal strength of the phase advancing function and the phase delaying function, the resultant low-pass function is substantially vanished in the position where the two filters are superimposed with the regions with the phase promoting function coinciding with the regions with the phase delaying function.

Seventh Embodiment

Figure 8A:
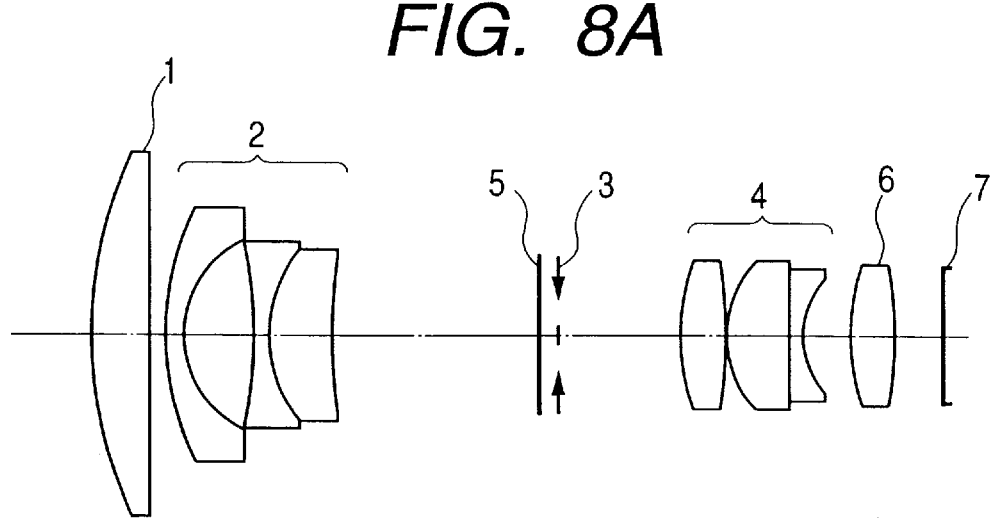
FIGS. 8A, 8B and 8C are diagrams showing the arrangement of a zoom optical system according to a seventh embodiment of the present invention at the wide angle end, the intermediate focal length, and the telephotographic end, respectively.
Figure 8B:
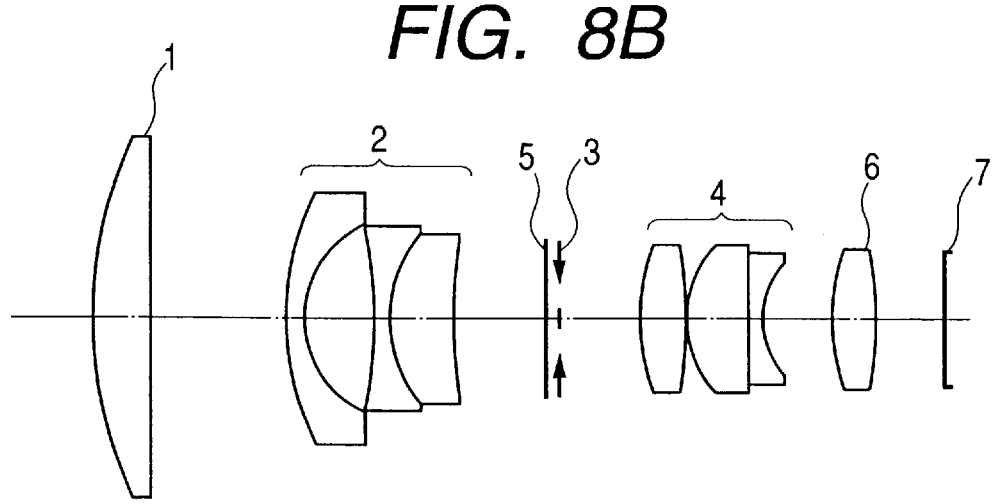
Figure 8C:
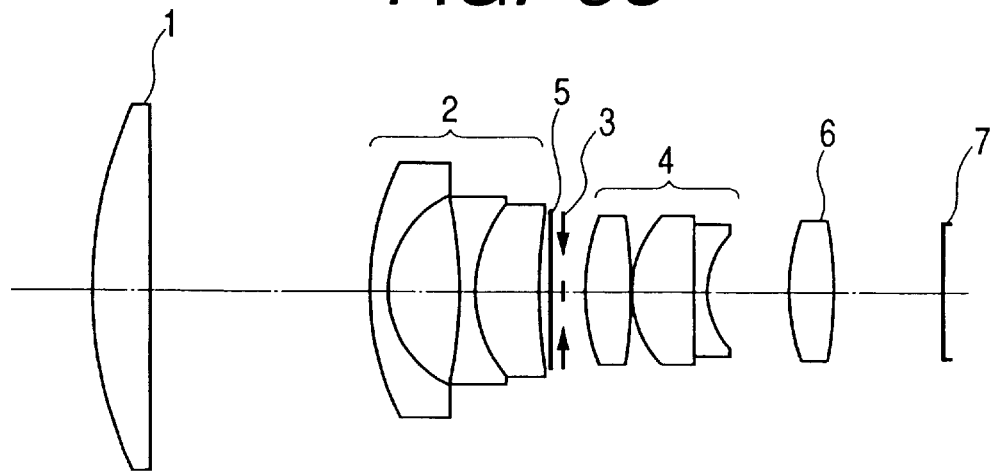

The configuration of a seventh embodiment is shown in FIGS. 8A to 8C. The optical system of the seventh embodiment comprises, in order from an object side, a first lens unit 1 which has a positive power and is fixed during a magnification change, a second lens unit 2 which has a negative power, is movable during a magnification change and has a magnification changing function, a low-pass phase filter 5, an aperture diaphragm 3 which has a variable aperture diameter and is fixedly positioned in the optical path during a magnification change, a third lens unit 4 which has a positive power, is movable during a magnification change and has a magnification changing function, a fourth lens unit 6 which has a positive power and is movable during a magnification change, and an image pickup device surface 7. The optical system is constructed so that the amount of movement of the second lens unit 2 is largest through the entire variable magnification range among all the lens units. The optical system is constructed so that the maximum aperture diameter of the aperture diaphragm is constant from the wide angle end to the telephotographic end and thus the open F number is changed in accordance with a magnification change. Since the optical system does not includes a quartz low-pass filter as a conventional case does, it allows the lens units to be disposed relatively close to the image pickup device on the object side thereof so as to contribute to downsizing and a high performance of a zoom optical system. The low-pass phase filter 5 is disposed in the vicinity of the aperture diaphragm 3. Since the beam of light is wide at this position, it is advantageous for design and production of a low-pass phase filter.

The low-pass effect at the image pickup surface is changed during a magnification change. Since the low-pass phase filter 5 is constructed such that the image pickup device can exhibit its best performance when the low-pass effect at the image pickup surface is weakest, there would be some magnification state where the low-pass effect is so strong that the image quality is deteriorated. This configuration, however, is free from a false signal or the like and is simple in the lens system, and thus is preferable for downsizing and cost reduction of the system as a whole.

In the seventh embodiment, the lens units disposed on the image side of the low-pass filter 5 are moved along the optical axis for zooming accompanied by change of the focal length and for focusing at a close position. When the optical system is focused, at the telephotographic end position, an object point at the infinite distance, which coincides with the focal point of the optical system at the telephotographic end, the low-pass effect at the image pickup surface is weakest. The low-pass filter is constructed such that the image pickup device can exhibit its best performance under this condition.

FIGS. 9A, 9B and 9C are graphs showing MTF versus spatial frequency of the entire lens system at the image center, at the wide angle end, the intermediate focal length, and the telephotographic end, respectively. Specifically, the smallest pitch p of the picture elements of the image pickup device is 0.0074 mm. It is defined that in the state where the optical system is focused on an object point at the infinite distance at the telephotographic end position, the cutoff spatial frequency fc of the lens system is largest with respect to MTF measured at the image center. It is configured that values of MTF in this state should be 0.05 or less for spatial frequencies higher than the Nyquist frequency of 67.5/mm as well as a value of MTF at two third the Nyquist frequency ($=\frac{1}{3}p=45$/mm) should be highest in this state among all possible states of the lens unit movement. As a result, generation of moire can be repressed over the entire moving region of the lens system as well as the configuration of the lens system can be simplified.

Eighth Embodiment

Figure 10:
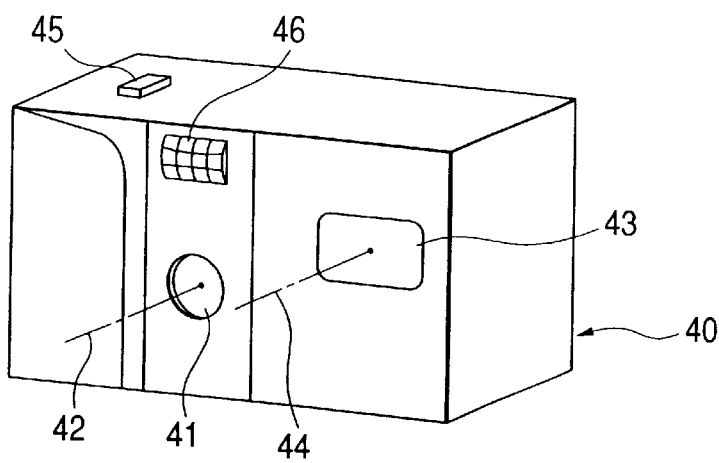
FIGS. 10 and 11 are a front side perspective view and a rear side perspective view showing the outside appearance of a digital camera according to an eighth embodiment, with an optical system having a low-pass phase filter applied to a photographing zoom lens.
Figure 11:
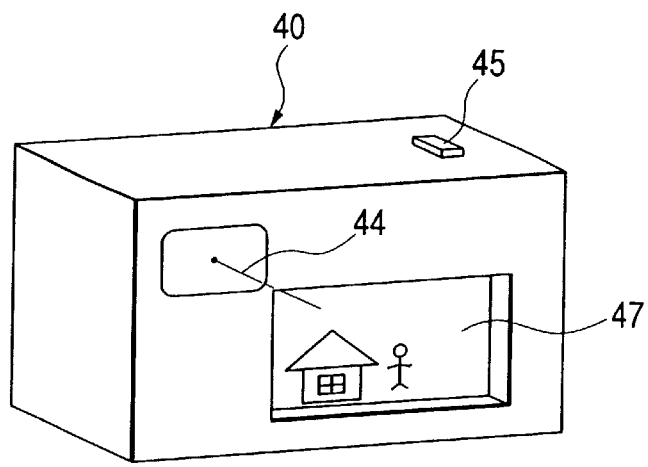
Figure 12:
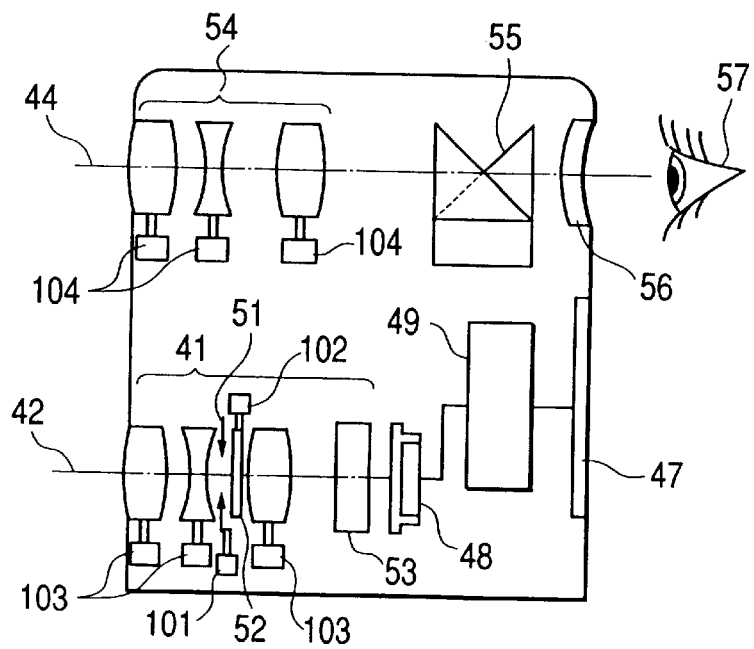
FIG. 12 is a cross-sectional view schematically showing the configuration of the camera of FIG. 11.

With reference to FIGS. 10, 11 and 12, an eighth embodiment will be explained. In the eighth embodiment, such a lens system with a low-pass phase filter as to obtain a preferable low-pass effect as mentioned above is used for a photographing zoom lens of a digital camera. The digital camera 40 includes the photographing zoom lens 41 which forms a photographing optical path 42, a finder optical system 43 which forms a finder optical path 44, a release button 45, a stroboscopic lamp 46, a liquid crystal display monitor 47, etc. When the release button 45 arranged in the upper part of the camera 40 is pushed, an aperture of a diaphragm 51 is adjusted to an appropriate value by a variable stop mechanism 101 accordingly, and, at the same time, an exposure time for which a CCD 48 is to perform reading is adjusted and the photographing operation is executed through the photographing zoom lens 41.

An object image by the photographing zoom lens 41 is formed on an image pickup surface of the CCD 48 via a low-pass filter 52 and an IR cut filter 53 disposed in the optical path 42. In this operation, the focal length and the focusing condition are adjusted by driving motors 103, and the low-pass filter 52 is moved along the optical axis by a driving device 102 so as to compensate the change of the low-pass effect caused by lens movement. It is also possible to construct the driving device 102 such as to change the low-pass function of the low-pass unit according to the above-mentioned embodiments. The object image received by the CCD 48 is displayed as an electronic image on the liquid crystal display monitor 47 provided on the rear surface of the camera 40 via a processing means 49. The processing means 49 is provided with a memory or the like so as to record a photographed electronic image.

On the other hand, the finder optical system 43 comprises a finder zoom objective optical system 54, a Porro prism system 55, and an ocular optical system 56. Interlocked with a change of the focal length of the photographing zoom lens 41, the focal length of the finder zoom objective optical system 54 is changed by a driving motor 104. An intermediate image formed by the objective optical system 54 is introduced to an eye 57 of a photographer via the Porro prism system 55 and the ocular optical system 56 so that the photographer can confirm the photographing range.

Although an example of a digital camera that integrally includes a CCD and a photographing zoom lens has been explained in this embodiment, it is possible to provide a photographing zoom lens separately, with a mount portion for connecting a lens section and a main body being provided for each of them. Moreover, a single focus lens only for focusing can also be adopted, or a lens system with a low-pass phase filter of the above-mentioned various kinds of configurations can be adopted.

Although typical zoom lens type applications have mainly been explained in the above-mentioned basic configurations and the embodiments, the present invention is not limited thereto. The present invention can also be adopted for a magnification change caused by focusing.

In the present invention, it is not prerequisite to dispose at least one lens unit having a magnification changing function on the image pickup device side of the aperture diaphragm. That is, in an optical system without a lens unit having a magnification changing function disposed on the image pickup device side of the aperture diaphragm, a constant low-pass effect can be obtained at the image pickup surface by disposing the low-pass phase filter in the vicinity of the aperture diaphragm. However, in such a case where the low-pass phase filter is required to be disposed at a position where a beam of light is much wider, the present invention is applicable also to an optical system without a lens unit having a magnification changing function disposed on the image pickup device side of the aperture diaphragm.

Moreover, in order to simplify the explanation, the lens system and the electronic image pickup means have been explained in relation to each other. However, for example, in the case of a lens exchange type digital camera, a configuration without an electronic image pickup means can be adopted to the present invention, with the electronic image pickup means being provided separately.

As is apparent from the explanation heretofore given, the present invention is not limited to the above-mentioned individual configurations, but optional combinations or modifications thereof are included in the scope of the present invention as long as they are based on the basic concept of using a low-pass phase filter and obtaining a preferable low-pass effect.

As heretofore explained, the present invention can provide a small-sized and inexpensive zoom optical system or lens system which uses a low-pass phase filter, is capable of providing a substantially necessary low-pass effect, has a sufficient magnification ratio and is compatible with an electronic image pickup device, and a camera using the same zoom optical system or lens system.

What is claimed is:

1. A zoom lens comprising:
   a plurality of lens units;
   an aperture diaphragm; and
   a low-pass phase filter,
   wherein intervals among said plurality of lens units change during a magnification change,
   wherein at least one lens unit contributing to a magnification changing function is disposed on a side of an image plane with respect to said aperture diaphragm,
   wherein most of the magnification changing function is executed by lens units disposed on an object side of said low-pass phase filter, and
   wherein at least one lens unit is disposed between said low-pass phase filter and the image plane.

2. A zoom lens according to claim 1, wherein the lens units disposed on the object side of said low-pass phase filter includes a lens unit with a longest movable distance in a magnification change.

3. A zoom lens according to claim 1, wherein said at least one lens unit contributing to the magnification changing function and disposed on the side of the image plane with respect to said aperture diaphragm changes magnification by moving along an optical axis.

4. A zoom lens according to claim 1, wherein at least one lens unit contributing to the magnification changing function is disposed on the object side of said aperture diaphragm.

5. A zoom lens according to claim 1, wherein said low-pass phase filter has a function of dividing a wavefront of an incident beam of light into a large number.

6. A zoom lens according to claim 1, wherein said low-pass phase filter includes a diffraction grating.

7. A camera comprising:

a zoom lens according to claim 1; and an electronic image pickup device disposed on the image plane.

8. A zoom lens comprising:

a plurality of lens units;

an aperture diaphragm; and low-pass phase filter, wherein intervals among said plurality of lens units change during a magnification change, wherein at least one lens unit contributing to a magnification changing function is disposed on a side of an image plane with respect to said aperture diaphragm, wherein most of the magnification changing function is executed by lens units disposed on an object side of said low-pass phase filter, and wherein at least one lens unit that is fixed during a magnification change is disposed between said low-pass phase filter and the image plane.

9. A zoom lens comprising:

a plurality of lens units;

an aperture diaphragm; and a low-pass phase filter, wherein intervals among said plurality of lens units change during a magnification change, wherein at least one lens unit contributing to a magnification changing function is disposed on a side of an image plane with respect to said aperture diaphragm, wherein most of the magnification changing function is executed by lens units disposed on an object side of said low-pass phase filter, and wherein, with a phase of a wavefront at a center of an incident beam of light being taken as a reference, phase advancing regions, which have a function of advancing the phase of the wavefront of the incident beam of light, and phase delaying regions, which have a function of delaying the phase of the wavefront of the incident beam of light, form an alternate arrangement in said low-pass phase filter.

10. A lens system comprising:

a plurality of lens units;

an aperture diaphragm; and a low-pass phase filter, wherein at least one lens unit contributing to a magnification changing function is disposed on a side of an image plane with respect to both of said aperture diaphragm and said low-pass phase filter, and said low-pass phase filter changes its distance from the image plane separately from the lens unit contributing to the magnification changing function during a magnification change caused by the lens unit contributing to the magnification changing function.

11. A lens system according to claim 10, wherein a low-pass effect at the image plane is kept substantially constant by movement of said low-pass phase filter.

12. A lens system according to claim 10, wherein said plurality of lens units act as a zoom lens by changing intervals between one another to perform zooming.

13. A lens system according to claim 10, wherein the lens units contributing to the magnification changing function changes magnification by moving along an optical axis.

14. A lens system according to claim 10, wherein an aperture diameter of said aperture diaphragm is changeable.

15. A camera comprising:

a lens system according to claim 10; and an electronic image pickup means disposed on the image plane.

16. A lens system comprising:

a plurality of lens units; and a low-pass phase filter, wherein at least one lens unit contributing to a magnification changing function is disposed on a side of an image plane with respect to said low-pass phase filter, and a function of said low-pass phase filter is changed during a magnification change which is caused by the lens unit contributing to the magnification changing function.

17. A lens system according to claim 16, wherein a low-pass effect at the image plane is kept substantially constant by change of the function of said low-pass phase filter.

18. A lens system according to claim 16, wherein said plurality of lens units act as a zoom lens by changing intervals between one another to perform zooming.

19. A lens system according to claim 16, wherein the lens unit contributing to the magnification changing function changes magnification by moving along an optical axis.

20. A lens system according to claim 16, wherein an aperture diaphragm is disposed on an object side of the lens unit contributing to the magnification changing function.

21. A lens system according to claim 20, wherein said aperture diaphragm and said low-pass phase filter are disposed adjacent to one another.

22. A lens system according to claim 20, wherein an aperture diameter of said aperture diaphragm is changeable.

23. A lens system according to claim 16, wherein said low-pass phase filter is fixedly positioned with respect to the image plane.

24. A lens system according to claim 16, wherein said low-pass phase filter includes a liquid crystal, and the function of said low-pass phase filter is changed by a change of a refracting function thereof in a direction of an optical axis.

25. A lens system according to claim 16, wherein said low-pass phase filter includes a plurality of low-pass phase filter elements, and the function of said low-pass phase filter is changed by a change of positional relationship between the low-pass phase filter elements.

26. A lens system according to claim 16, wherein said low-pass phase filter includes a plurality of low-pass phase filter elements, and the function of said low-pass phase filter is changed by a change of positional relationship between the low-pass phase filter elements which is caused by a movement of at least one of the low-pass phase filter elements on a plane perpendicular to an optical axis.

27. A lens system according to claim 16, wherein said low-pass phase filter includes a plurality of low-pass phase filter elements, and the function of said low-pass phase filter is changed by a change of positional relationship between the low-pass phase filter elements which is caused by a rotational movement of at least one of the low-pass phase filter elements on a plane perpendicular to an optical axis.

28. A camera comprising:
a lens system according to claim 16; and
an electronic image pickup means disposed on the image plane.

29. A lens system comprising:
a plurality of lens units which form an image plane; and
a low-pass phase filter,
wherein said low-pass phase filter comprises a plurality of low-pass phase filter elements, with at least one of the low-pass phase filter elements being insertable and removable in and out of an optical path.

30. A lens system according to claim 29, wherein a low-pass effect at the image plane is kept substantially constant by insertion and removal of the low-pass phase filter element.

31. A lens system comprising:
a plurality of lens units which form an image plane; and
a low-pass phase filter,
wherein said low-pass phase filter comprises a plurality of low-pass phase filter elements, and a low-pass function of at least one of the low-pass phase filter elements is changeable.

32. A lens system according to claim 29 or 31, wherein said plurality of lens units act as a zoom lens by changing intervals between one another to perform zooming.

33. A lens system according to claim 29 or 31, wherein at least one lens unit of said plurality of lens units contributes to a magnification changing function.

34. A lens system according to claim 33, wherein the lens unit contributing to the magnification changing function changes magnification by moving along an optical axis.

35. A lens system according to claim 33, wherein an aperture diaphragm is disposed on an object side of the lens unit contributing to the magnification changing function.

36. A lens system according to claim 35, wherein an aperture diameter of said aperture diaphragm is changeable.

37. A lens system according to any one of claims 10, 16, 29 and 31, wherein, with a phase of a wavefront at a center of an incident beam of light being taken as a reference, phase advancing regions, which have a function of advancing the phase of the wavefront of the incident beam of light, and phase delaying regions, which have a function of delaying the phase of the wavefront of the incident beam of light, form an alternate arrangement in said low-pass phase filter.

38. A lens system according to any one of claims 10, 16, 29 and 31, wherein said low-pass phase filter has a function of dividing a wavefront of an incident beam of light into a large number.

39. A lens system according to any one of claims 10, 16, 29 and 32, wherein said low-pass phase filter includes a diffraction grating.

40. A camera comprising:
a lens system according to claim 29 or 31; and
an electronic image pickup means disposed on the image plane.

41. A camera comprising:
a lens system including a plurality of lens units and a low-pass phase filter; and
an electronic image pickup device,
wherein at least one lens unit contributing to a magnification changing function is disposed on a side of said electronic image pickup device with respect to said low-pass phase filter, and
said low-pass phase filter is constructed to have a low-pass function such that said electronic image pickup device exhibits its best performance when a low-pass effect at said electronic image pickup device is weakest in a variable magnification range.

42. A camera according to claim 41, wherein said plurality of lens units act as a zoom lens by changing intervals between one another to perform zooming.

43. A camera according to claim 41, wherein the lens unit contributing to the magnification changing function changes magnification by moving along an optical axis.

44. A camera according to claim 41, wherein an aperture diaphragm is disposed on an object side of the lens unit contributing to the magnification changing function.

45. A camera according to claim 44, wherein an aperture diameter of said aperture diaphragm is changeable.

46. A camera according to claim 41, wherein said low-pass phase filter is fixedly positioned with respect to said electronic image pickup device.

47. A camera according to claim 41, wherein said low-pass phase filter has a function of dividing a wavefront of an incident beam of light into a large number.

48. A camera according to claim 41, wherein said low-pass phase filter includes a diffraction grating.

49. A camera comprising:
a lens system including a plurality of lens units and a low-pass phase filter; and
an electronic image pickup device,
wherein at least one lens unit contributing to a magnification changing function is disposed on a side of said electronic image pickup device with respect to said low-pass phase filter, and
wherein said low-pass phase filter is constructed such that, in a state where a cutoff spatial frequency of the entire lens system is highest, values of MTF measured at a center of said electronic image pickup device are 0.3 or less for spatial frequencies higher than the Nyquist frequency, and a value of the MTF for two third the Nyquist frequency is highest in said state among all possible states of said lens units.

50. A camera according to claim 49, wherein said plurality of lens units act as a zoom lens by changing intervals between one another to perform zooming.

51. A camera according to claim 49, wherein the lens unit contributing to the magnification changing function changes magnification by moving along an optical axis.

52. A camera according to claim 49, wherein an aperture diaphragm is disposed on an object side of the lens unit contributing to the magnification changing function.

53. A camera according to claim 49, wherein an aperture diameter of said aperture diaphragm is changeable.

54. A camera according to claim 49, wherein said low-pass phase filter is fixedly positioned with respect to said electronic image pickup device.

55. A camera according to claim 49, wherein said low-pass phase filter has a function of dividing a wavefront of an incident beam of light into a large number.

56. A camera according to claim 49, wherein said low-pass phase filter includes a diffraction grating.

57. A camera comprising:
a lens system including a plurality of lens units and a low-pass phase filter; and
an electronic image pickup device,
wherein at least one lens unit contributing to a magnification changing function is disposed on a side of said electronic image pickup device with respect to said low-pass phase filter,
wherein said low-pass phase filter is constructed to have a low-pass function such that said electronic image pickup device exhibits its best performance when a low-pass effect at said electronic image pickup device is weakest in an entire variable magnification change, and wherein, with a phase of a wavefront at a center of an incident beam of light being taken as a reference, phase advancing regions, which have a function of advancing the phase of the wavefront of the incident beam of light, and phase delaying regions, which have a function of delaying the phase of the wavefront of the incident beam of light, form an alternate arrangement in said low-pass phase filter.

58. A zoom lens comprising:

a plurality of lens units;

an aperture diaphragm; and a low-pass phase filter, wherein intervals among said plurality of lens units change during a magnification change, wherein at least one lens unit contributing to a magnification changing function is disposed on a side of an image plane with respect to said aperture diaphragm, wherein most of the magnification changing function is executed by lens units disposed on an object side of said low-pass phase filter, and wherein at least one lens unit that is moved along an optical axis during a magnification change is disposed between said low-pass phase filter and the image plane.

59. A zoom lens according to claim 58, wherein the lens units disposed on the object side of said low-pass phase filter includes a lens unit with a longest movable distance in a magnification change.

60. A zoom lens according to claim 58, wherein at least one lens unit contributing to the magnification changing function is disposed on the object side of said aperture diaphragm.

61. A zoom lens according to claim 58, wherein said low-pass phase filter has a function of dividing a wavefront of an incident beam of light into a large number.

62. A zoom lens according to claim 58, wherein said low-pass phase filter includes a diffraction grating.

63. A camera comprising:

a zoom lens according to claim 58; and an electronic image pickup device disposed on the image plane.

64. A zoom lens comprising:

a plurality of lens units;

an aperture diaphragm; and a low-pass phase filter, wherein intervals among said plurality of lens units change during a magnification change, wherein at least one lens unit contributing to a magnification changing function is disposed on a side of an image plane with respect to said aperture diaphragm, wherein most of the magnification changing function is executed by lens units disposed on an object side of said low-pass phase filter, wherein at least one lens unit is disposed between said low-pass phase filter and the image plane, and wherein at least one lens element is disposed between said aperture diaphragm and said low-pass phase filter.

65. A zoom lens according to claim 64, wherein the lens units disposed on the object side of said low-pass phase filter includes a lens unit with a longest movable distance in a magnification change.

66. A zoom lens according to claim 64, wherein at least one lens unit contributing to the magnification changing function is disposed on the object side of said aperture diaphragm.

67. A zoom lens according to claim 64, wherein said low-pass phase filter has a function of dividing a wavefront of an incident beam of light into a large number.

68. A zoom lens according to claim 64, wherein said low-pass phase filter includes a diffraction grating.

69. A camera comprising:

a zoom lens according to claim 64; and an electronic image pickup device disposed on the image plane.

* * * * *